United States Patent
Pasqua

(10) Patent No.: US 10,053,189 B2
(45) Date of Patent: Aug. 21, 2018

(54) BICYCLE ELECTRIC FRONT DERAILLEUR

(71) Applicant: CAMPAGNOLO S.r.l., Vicenza (IT)

(72) Inventor: Paolo Pasqua, Camisano Vicentino (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/639,704

(22) Filed: Jun. 30, 2017

(65) Prior Publication Data

US 2018/0001960 A1    Jan. 4, 2018

(30) Foreign Application Priority Data

Jul. 4, 2016    (IT) .............................. UA2016A4886

(51) Int. Cl.
| | | |
|---|---|---|
| F16H 9/00 | (2006.01) | |
| F16H 59/00 | (2006.01) | |
| F16H 61/00 | (2006.01) | |
| F16H 63/00 | (2006.01) | |
| B62M 9/132 | (2010.01) | |
| B62M 25/08 | (2006.01) | |

(52) U.S. Cl.
CPC ............ B62M 9/132 (2013.01); B62M 25/08 (2013.01)

(58) Field of Classification Search
CPC ...... B62M 25/08; B62M 9/122; B62M 9/132; B62M 25/02; B62M 25/04
USPC ..................................................... 474/80, 82
See application file for complete search history.

(56) References Cited

U.S. PATENT DOCUMENTS

| | | | | |
|---|---|---|---|---|
| 3,919,891 A | * | 11/1975 | Stuhlmuller | ........... B62M 9/122 192/142 R |
| 4,946,425 A | * | 8/1990 | Buhlmann | ............. B62M 9/122 192/142 R |
| 5,059,158 A | * | 10/1991 | Bellio | ...................... B62M 9/12 474/103 |
| 5,577,969 A | * | 11/1996 | Watarai | .................. B62M 9/122 474/78 |
| 6,726,586 B2 | * | 4/2004 | Fukuda | .................. B62M 9/122 474/70 |
| 6,843,741 B2 | * | 1/2005 | Fujii | ....................... B62M 9/04 280/238 |
| 6,899,649 B2 | * | 5/2005 | Ichida | .................... B62M 25/02 474/70 |
| 7,331,890 B2 | * | 2/2008 | Ichida | .................... B62M 9/132 474/80 |
| 7,341,532 B2 | * | 3/2008 | Ichida | .................... B62M 9/132 474/70 |

(Continued)

FOREIGN PATENT DOCUMENTS

DE    102013004966 A1    4/2014
DE    202015003732 U1    7/2015

(Continued)

OTHER PUBLICATIONS

Italian Search Report and Written Opinion in Italian Application No. UA2016A004886, dated Mar. 31, 2017, with English translation.

*Primary Examiner* — Henry Y Liu

(74) *Attorney, Agent, or Firm* — Volpe and Koenig, P.C.

(57) ABSTRACT

A bicycle electric front derailleur is disclosed that includes a support body that is configured to be attached to a frame of the bicycle, a chain guide connected to the support body through a linkage, an electric motor that drives the linkage to displace the chain guide among toothed wheels of a motion transmission system, and a battery power supply unit. The battery power supply unit is supported by the chain guide.

19 Claims, 9 Drawing Sheets

(56) References Cited

U.S. PATENT DOCUMENTS

| | | | | |
|---|---|---|---|---|
| 7,503,863 B2 * | 3/2009 | Ichida | ................... | B62M 9/132 474/70 |
| 7,704,173 B2 * | 4/2010 | Ichida | ................... | B62M 25/08 474/80 |
| 7,779,724 B2 * | 8/2010 | Fujii | ................... | B62M 25/08 192/217 |
| 7,980,974 B2 * | 7/2011 | Fukuda | ................... | B62M 9/122 474/70 |
| 8,137,223 B2 * | 3/2012 | Watarai | ................... | B62K 23/06 280/260 |
| 8,241,158 B2 * | 8/2012 | Ishikawa | ................... | B62M 25/08 474/80 |
| 8,864,611 B2 * | 10/2014 | Kuwayama | ................... | B62M 9/135 474/80 |
| 8,888,620 B2 * | 11/2014 | Emura | ................... | B62M 9/135 474/80 |
| 8,974,331 B2 * | 3/2015 | Yamaguchi | ................... | B62M 9/122 474/80 |
| 8,979,683 B2 * | 3/2015 | Katsura | ................... | B62M 25/08 474/80 |
| 9,005,059 B2 * | 4/2015 | Suyama | ................... | B62M 9/122 474/80 |
| 9,676,444 B2 * | 6/2017 | Shipman | ................... | B62M 9/122 |

FOREIGN PATENT DOCUMENTS

| | | |
|---|---|---|
| DE | 202015005016 U1 | 10/2015 |
| EP | 1568593 B1 | 1/2007 |
| EP | 1818253 A2 | 8/2007 |
| EP | 1752373 B1 | 11/2008 |
| EP | 1424275 B1 | 3/2010 |
| EP | 1970299 B1 | 9/2011 |
| EP | 2090505 B1 | 10/2011 |
| EP | 2712799 A2 | 4/2014 |
| EP | 2719616 A2 | 4/2014 |
| EP | 2722266 A1 | 4/2014 |
| EP | 2727810 A2 | 5/2014 |
| EP | 2902308 A1 | 8/2015 |

* cited by examiner

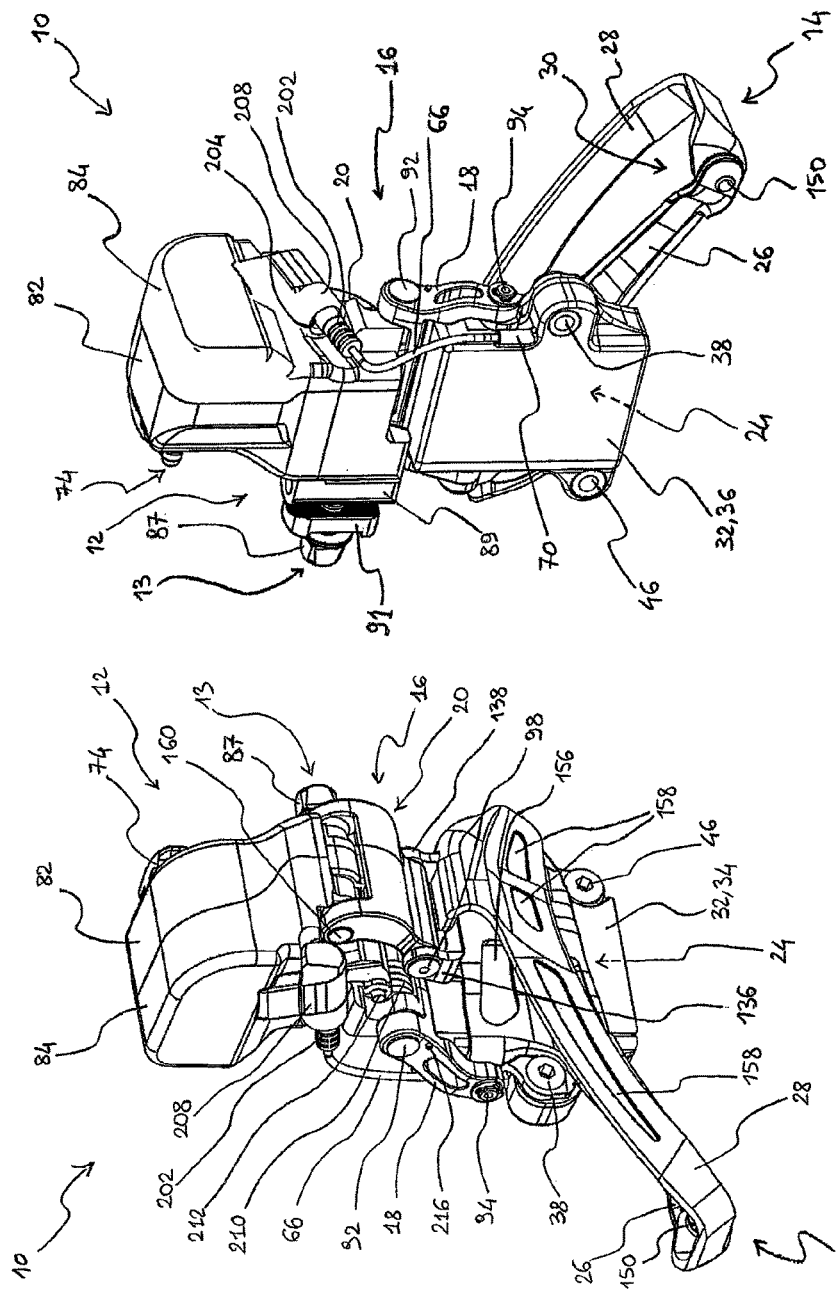

BICYCLE ELECTRIC FRONT DERAILLEUR

CROSS REFERENCE TO RELATED APPLICATION

This application claims the benefit of Italian Application No. UA2016A004886, filed on Jul. 4, 2016, which is incorporated herein by reference as if fully set forth.

FIELD OF INVENTION

The present invention relates to a bicycle electric front derailleur of an electronically servo-assisted gearshift—hereinafter briefly called electronic gearshift—and in particular to a front derailleur provided with its own power supply battery.

BACKGROUND

With reference to FIG. 1, a motion transmission system in a bicycle 1100 comprises a chain 1101 extending between toothed wheels 1102, 1103 associated with the axle of the pedal cranks 1104 and with the hub 1105 of the rear wheel 1106. When—as in the case shown—there is an assembly of toothed wheels 1102, 1103 comprising more than one toothed wheel 1102, 1103 at at least one of the axle of the pedal cranks 1104 and the hub 1105 of the rear wheel 1106, and the motion transmission system is therefore provided with a gearshift 1110, a front derailleur 1111 and/or a rear derailleur 1112 are provided for.

In case of an electronic gearshift, each derailleur 1111, 1112 comprises a guide element 1113, 1114—also known as chain guide or cage or, in case of a rear derailleur, rocker arm—movable to displace the chain 1101 among the toothed wheels 1102, 1103 in order to change the gear ratio, and an electromechanical actuator to displace the chain guide 1113, 1114.

Each actuator in turn typically comprises a motor, typically an electric motor, coupled with the chain guide 1113, 1114 through a linkage, such as an articulated parallelogram, a rack system or a worm screw system. Typically, the electric motor is provided with a gear reduction assembly. The assembly of electric motor and gear reduction assembly is referred to hereinafter as motor gear (or geared motor). The actuator typically further comprises a sensor or transducer of the position, speed, acceleration and/or direction of rotation of the rotor of the motor, or of any moving part downstream of the rotor, down to the chain guide 1113, 1114 itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons, typically provided on one or two manual command devices 1107 mounted to the handlebars 1108 of the bicycle 1100.

Typically, the derailleur 1111, 1112 includes a support body 1118, 1119 that is configured to be attached to the frame of bicycle 1100, and the chain guide 1113, 1114 connected to the support body 1118, 1119 by means of two connecting rods, the ends of which are articulated to the support body 1118, 1119 and to the chain guide 1113, 1114 to form said articulated parallelogram 1116.

The motor gear drives the articulated parallelogram open and closed, and as a consequence the displacement of the chain guide 1113, 1114 among the toothed wheels 1102, 1103.

In some known electronic gearshifts there is a central battery power supply unit, shared by all of the components of the gearshift 1110, and typically arranged in a fairly central position on the frame of the bicycle 1100.

In other electronic gearshifts, there is a battery power supply unit dedicated to the front derailleur (as well as one or more other battery power supply unit(s) dedicated to the other components of the gearshift). In such cases, the battery power supply unit is typically supported on the frame of the bicycle 1100 close to the support body 1118 of the front derailleur 1111, or on the support body 1118 itself of the front derailleur 1111.

Indeed, in the field of bicycle components it has always been considered that the linkage of the derailleur should move a load that is as light as possible, so as not to require particularly large sizing and high strength and, in the case of an electronic gearshift, so as to be able to use the smallest possible electric motor.

Furthermore, in the field of bicycle components it has always been considered suitable to keep electrical power consumption as low as possible in order to allow the maximum possible autonomy far from the electrical mains.

The Applicant, solving the technical problem of providing a bicycle electric front derailleur that has an alternative configuration, has now overcome these prejudices of the prior art.

SUMMARY

The invention relates to a bicycle electric front derailleur including a support body that is configured to be attached to a bicycle frame, a chain guide connected to the support body through a linkage, an electric motor that drives the linkage to displace the chain guide among toothed wheels of a motion transmission system, and a battery power supply unit supported by the chain guide.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the single configurations can be combined with each other as desired. In the following description, to illustrate the figures identical or similar reference numerals are used to indicate constructive or functional elements with the same function or analogous function. In the drawings:

FIGS. 2 and 3 are perspective views of an electric front derailleur according to a first embodiment of the invention, FIGS. 13-15 illustrate a chain guide, a power supply unit, and some other components of a bicycle electric front derailleur according to a fifth embodiment of the invention, wherein FIGS. 13 and 15 are perspective views of the components in two distinct mutual relationships, and FIG. 14 illustrates a partial cross-section taken along line XIV-XIV of FIG. 13.

DETAILED DESCRIPTION OF THE PREFERRED EMBODIMENTS

Figure 1:
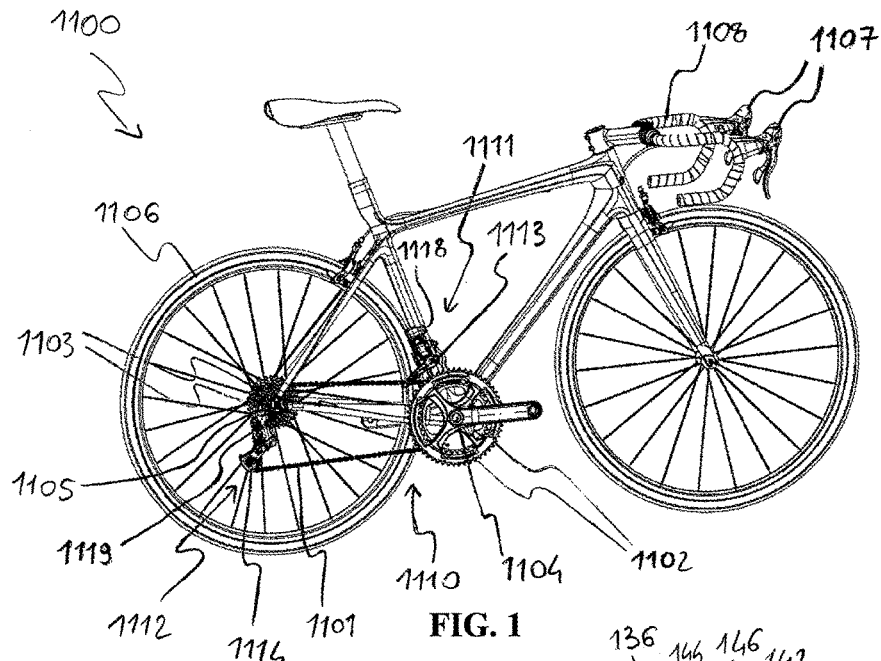
FIG. 1, already described in detail, is a side view of a bicycle equipped with an electronic gearshift according to the prior art.

In one aspect, the invention relates to an electric front derailleur of a bicycle, comprising a support body that is configured to be attached to a frame of the bicycle, a chain guide connected to the support body through a linkage, an electric motor that drives the linkage to displace the chain guide among toothed wheels of a motion transmission system, and a battery power supply unit, wherein the battery power supply unit is supported by the chain guide With such a configuration, the battery power supply unit can be easier to be accessed and replaced, and the removal thereof from the bicycle can take place without having to disassemble the derailleur.

Furthermore, the battery power supply unit stabilizes the chain guide increasing the inertia thereof, so that it better tolerates vibrations.

Preferably, the battery power supply unit is provided for supplying power to the electric motor and/or to at least some electric or electronic components of the derailleur.

Typically, a driving circuit of the electric motor, a control circuit of the derailleur, a communication circuit with the remaining components of an electronic gearshift of a bicycle, etc., are provided among the electronic components of the derailleur.

Preferably, the battery power supply unit is housed within a container.

More preferably, the container housing the battery power supply unit is removably supported by the chain guide.

In the present description and in the attached claims, under "removably" it is meant to indicate that it is possible to disconnect two components without breaking or damaging them.

The container can be screwed onto the chain guide.

Alternatively, the container can be held on the chain guide by means of at least one holding device.

In other embodiments, the container comprises a portion for the battery power supply unit that is fixedly supported by the chain guide.

In the present description and in the attached claims, under "fixedly" it is meant to indicate that it is not possible to disconnect two components without breaking or damaging them.

Preferably, the housing portion of the container is made in one piece with the chain guide.

Even more preferably, the housing portion of the container is co-molded with the chain guide.

Alternatively, the housing portion of the container could for example be welded or glued to the chain guide.

Preferably, the housing portion of the container is provided with an opening for the insertion and removal, respectively, of the battery power supply unit, a door being provided for closing the opening.

More preferably, the door for closing the opening is made in one piece, even more preferably co-molded, with the housing portion.

Alternatively, the door could be fixed, for example welded or glued, to the housing portion, or it could be removably constrained to the housing portion, for example screwed.

Preferably, the chain guide comprises an inner plate and an outer plate, and the battery power supply unit is supported by the inner plate.

In the present description and in the attached claims, under "inner" it is meant to indicate the side closest to the frame of the bicycle in the mounted condition of the derailleur, while under "outer" it is meant to indicate the side furthest from the frame of the bicycle in the mounted condition of the derailleur.

In this way, it is better protected from collisions, and less visible. Furthermore, it is housed between the chain guide and the frame of the bicycle, and therefore has a smaller actual bulk and less aerodynamic impact.

In the case described above of the container comprising a portion for housing the battery power supply unit that is fixedly supported by the chain guide, the opening of the housing portion of the container is preferably made on the inner face of the housing portion of the container.

In this way, the opening of the housing portion of the container can be easily accessed for the insertion and removal, respectively, of the battery power supply unit.

Alternatively or in addition, the opening and the related door could be made on another face of the container, for example on the bottom face of the housing portion of the container, which is opposite the (upper) face of the container that faces towards the support body.

Alternatively, the battery power supply unit can be supported by the outer plate, so as to be easier to be accessed.

The derailleur preferably comprises a management circuit of the battery power supply unit.

The battery power supply unit and the related management circuit form a so-called smart battery.

Preferably, the management circuit is housed within the same container as the battery power supply unit, so as to detect, e.g. the instantaneous temperature, in an optimal manner.

More preferably, the management circuit is housed within a same inner chamber of the container as the battery power supply unit, so as to advantageously be in close contact therewith.

Alternatively, the battery power supply unit is housed within a main inner chamber of the container, and the management circuit is housed within a secondary inner chamber of the container.

The derailleur preferably further comprises a recharging circuit for providing a recharge voltage and/or current of an intensity controlled over time to the battery power supply unit.

The recharging circuit can be supported by the support body.

In this case, preferably the recharging circuit is supported by a same printed circuit board on which a driving circuit of the electric motor is supported.

Alternatively, the recharging circuit can be supported by the chain guide.

In this case, the recharging circuit is preferably housed in within the same container as the battery power supply unit.

More preferably, the battery power supply unit is housed within a main inner chamber of the container, and the recharging circuit is housed within a or the secondary inner chamber of the container, respectively.

Preferably, the secondary inner chamber of the container is formed in an appendage of the container that extends along the chain guide, more preferably along the inner plate of the chain guide.

In this way, the appendage has the least possible aesthetic and aerodynamic impact.

Typically, the motor is coupled with a gear reduction mechanism to form a motor gear.

The gear reduction mechanism typically comprises a gear train.

Preferably, the motor and/or at least part of the electrical/electronic components powered by the battery power supply unit are fixedly supported on the support body.

In this case, preferably a flexible cable connects the container housing the battery power supply unit and the support body.

Such a power supply cable need only to allow the short stroke of the chain guide, of the order of one centimeter.

More preferably, the flexible cable terminates with a removable connector, and a matching removable connector is provided on the support body, so as to be able to detach the electrical connection, for example for long periods of inactivity.

As an alternative to removable connectors, between the battery power supply unit and the motor gear and/or the electronics powered by it, a fixed electrical connection can be provided, or a sliding contact can be provided.

Preferably, a recharging port is provided for the removable connection of the battery power supply unit to the electrical mains through a cable or a recharging device provided with a matching connector.

In embodiments, the recharging port is fixedly supported on the support body.

In other embodiments, the recharging port is supported by the chain guide.

Preferably, the recharging port faces an opening of a container.

More preferably, the container from which the recharging port faces is the one that houses the recharging circuit.

Preferably, the recharging port is of the USB type.

Preferably, the derailleur comprises a cover for protecting the recharging port when the cable or recharging device is not present.

More preferably, the cover is removable and replaceable.

Preferably, furthermore, the cover is flexible.

Even more preferably, the flexible cover is engageable on a small nail fixed to the derailleur, through elastic deformation of a holed sleeve of the flexible cover.

Preferably, the derailleur comprises a wireless communication circuit for the communication of data and commands with other components of a bicycle electronic gearshift.

Preferably, the wireless communication circuit and the recharging circuit are housed on a same printed circuit board.

Preferably, as stated, the derailleur comprises a driving circuit of the electric motor.

Preferably, the driving circuit of the electric motor is fixedly supported on the support body.

Preferably, the driving circuit and the recharging circuit, and more preferably also the wireless communication circuit, are housed on a same printed circuit board.

Preferably, the derailleur comprises a slack recovery spring that biases the chain guide.

By means of such a spring it is possible to keep the chain guide spaced from the chain during the rest condition of the derailleur, avoiding the dragging of the chain on the chain guide, and the associated friction and noise.

More preferably, said spring biases the chain guide towards the frame of the bicycle, differently from the prior art wherein the chain guide is biased away from the frame of the bicycle.

This provision therefore represents an innovative aspect per se, also in an electric derailleur—front or even rear—that does not have some of the features indicated above and/or in the rest of the description.

Typically, the linkage includes two connecting rods, the opposite ends of each of which are articulated to the support body and to the chain guide, to form an articulated parallelogram.

Preferably, an output shaft of the electric motor or of the motor gear coincides with an articulation pin of the articulated parallelogram linkage.

More preferably, a pin extending from one of the connecting rods engages in a hole formed at one end of the output shaft.

Preferably, furthermore, a second end of the output shaft of the electric motor or of the motor gear engages in a hole formed in said one of the connecting rods.

This configuration of the articulated parallelogram represents an innovative aspect per se, also in an electric derailleur—front or even rear—that does not have some of the features indicated above and/or in the rest of the description.

Alternatively, the electric motor is arranged along the diagonal of the articulated parallelogram.

Figure 4:
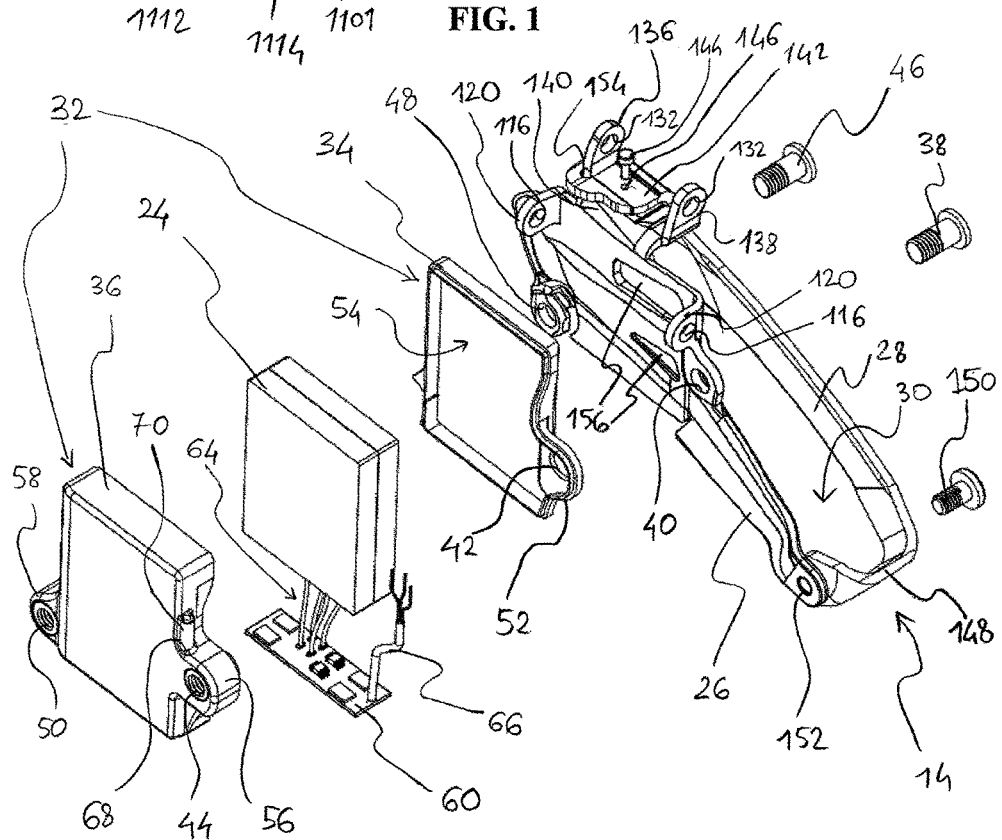
FIG. 4 is a partially exploded view illustrating a chain guide, a power supply unit, and some other components of a bicycle electric front derailleur according to the first embodiment of the invention.

Referring now to FIGS. 2-4, an electric front derailleur 10 of an electronic gearshift according to a first embodiment of the invention is disclosed.

The electric front derailleur 10 generally comprises a support body 12 configured to be attached to the frame of the bicycle 1100 through means generically indicated with 13 and better described hereinafter, a chain guide 14, and a linkage 16 that connects the chain guide 14 to the support body 12 so that it is displaceable among the toothed wheels 1102 associated with the axle of the pedal cranks 1104 of the motion transmission system of the bicycle 1100.

In the case shown, the chain guide 14 is connected to the support body 12 by means of two connecting rods or arms 18, 20, each articulated, at opposite ends, to the support body 12 and to the chain guide 14, respectively. In the case shown, the linkage 16 is therefore an articulated parallelogram.

Figure 5:
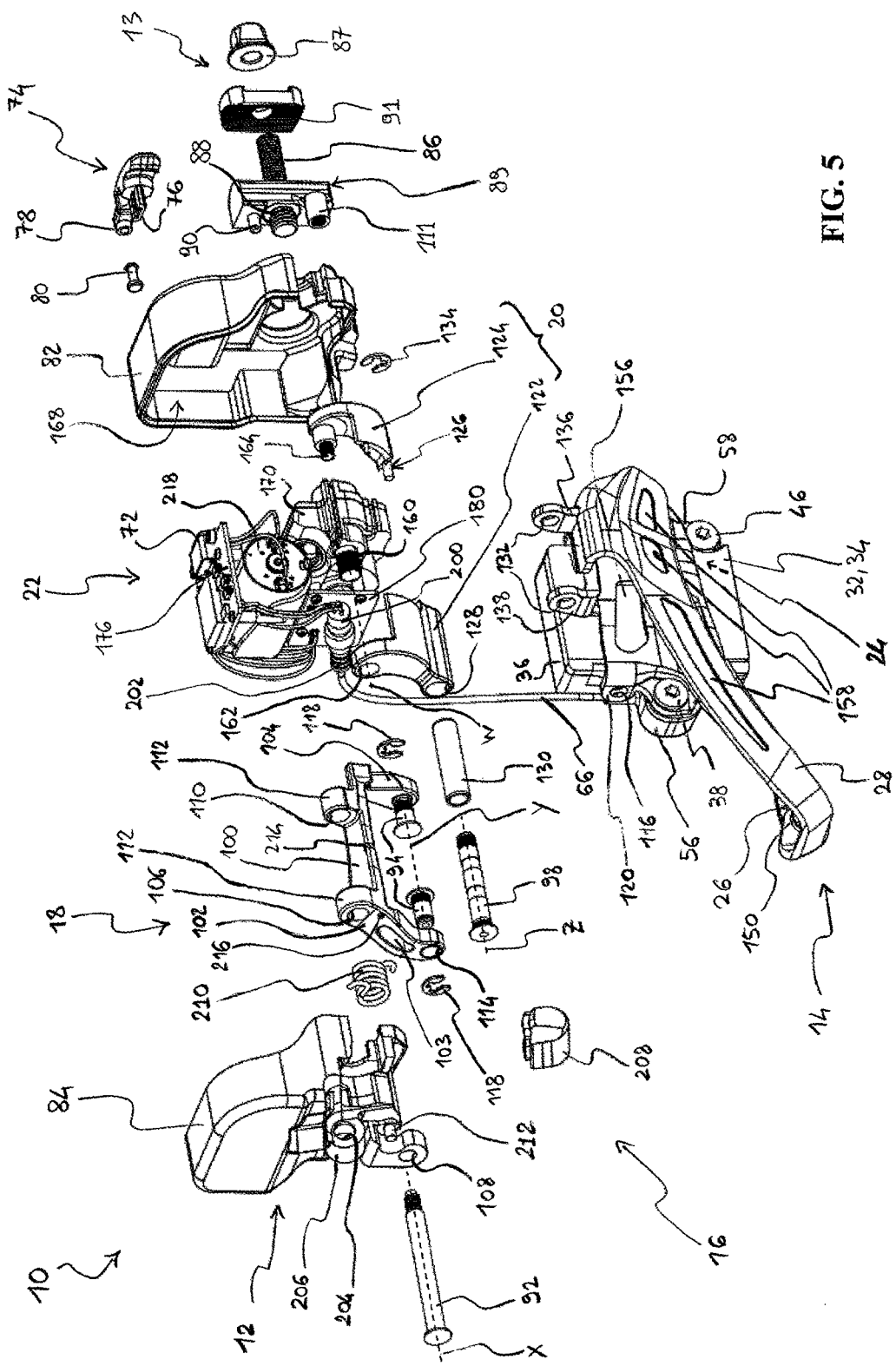
FIG. 5 is an exploded view of the electric front derailleur according to the first embodiment.

The linkage 16 is commanded by means of a motor gear (visible in FIG. 5 with reference numeral 22). Linkage 16 and motor gear 22 form an electromechanical actuator of the derailleur 10.

The electric front derailleur 10 further comprises a battery power supply unit 24 to provide the necessary power supply to the electric motor of the motor gear 22 and/or to a driving circuit thereof, and/or to other electrical/electronic components of the derailleur 10 itself.

Preferably, such electrical/electronic components of the derailleur 10 include a communication circuit for communicating data and commands with other components of the bicycle electronic gearshift of which the electric front derailleur 10 is part, in particular for receiving gearshifting request signals from manual command devices 1107.

Preferably, the communication circuit is of the wireless type, for example according to Bluetooth® protocol.

Preferably, such electrical/electronic components of the derailleur 10 further include a microcontroller for supervising the various aforementioned circuits.

When in particular the battery power supply unit 24 also powers the electric motor of the motor gear 22, and furthermore the communication circuit is wireless, the electric front derailleur 10 is advantageously stand-alone, and it is not necessary to provide any data/power supply connection cable with the rest of the electronic gearshift.

Furthermore, there can be a sensor or transducer of the position, speed, acceleration and/or direction of rotation of the rotor of the motor of the motor gear 22 or of any moving part downstream of the rotor, down to the chain guide 14 itself, to verify when the intended position has been reached by the chain guide 14, or more generally to provide feedback on the position of the chain guide 14 during use of the electronic gearshift.

The battery power supply unit 24 can for example be a lithium ion battery.

According to the invention, the battery power supply unit 24 is supported by the chain guide 14.

More specifically and with reference to FIG. 4, the chain guide 14 comprises an inner plate 26 and an outer plate 28 spaced apart so as to form a gap 30 in which the chain 1101 extends.

In the embodiment shown, the battery power supply unit 24 is supported by the inner plate 26 of the chain guide 14. In this way, it is better protected from collisions, and less visible. Furthermore, in the mounted condition of the derailleur 10, the battery power supply unit 24 is housed between the chain guide 14 and the frame of the bicycle 1100, and therefore has a smaller actual bulk and less aerodynamic impact.

Preferably, the chain guide 14 supports the battery power supply unit 24 in a removable manner. The removability, in this embodiment, is obtained through screwing.

In particular, the battery power supply unit 24 is housed within a container 32 formed by two portions 34, 36 that, in the present embodiment, are joined together and fixed to the chain guide 14 by means of a first screw 38 extending in an unthreaded hole 40 of the chain guide 14, in an unthreaded hole 42 of the portion 34, and screwed into a threaded hole 44 of the portion 36, as well as by means of a second screw 46 extending in an unthreaded hole 48 of the chain guide 14, and screwed into a threaded hole 50 of the portion 36. The second screw 46 does not pass through the first portion 34 of the container 32, but this would of course be possible.

The unthreaded hole 42 of the portion 34 of the container 32 is formed in a lug 52 projecting laterally with respect to an inner chamber 54 of the container 32, and the threaded holes 44, 50 of the portion 36 of the container 32 are formed in lugs 56, 58 projecting laterally with respect to the inner chamber 54 of the container 32.

In the embodiment discussed here, the container 32 houses, within the chamber 54, besides the battery power supply unit 24, a printed circuit board 60 (PCB).

The board 60 in particular houses components that embody a management circuit of the battery power supply unit 24.

Such a management circuit, per se known, typically includes a temperature sensor, and emits an alarm signal when the temperature goes outside of a predetermined range of temperatures and/or an approval signal for recharging and/or for use when the temperature falls within one or a respective predetermined temperature range. Alternatively and/or in addition, such a management circuit can monitor the voltage and/or the current of the cell(s) forming the battery power supply unit 24, emitting an alarm signal in case the values go outside predetermined ranges. The alarm signal can lead to the electrical insulation of the battery power supply unit 24 from the rest of the electric circuit, so as to safeguard the relative components thereof, also respecting current regulations. Furthermore, the management circuit can monitor the residual charge, take the charging cycles into account, etcetera.

The battery power supply unit 24 and the management circuit made on the board 60 form a so-called smart battery.

The arrangement of the board 60 carrying the management circuit in the same chamber 54 as the battery power supply unit 24, and in particular in close contact therewith, is advantageous because the temperature detected by the temperature sensor provides an accurate indication of the instantaneous temperature of the battery power supply unit 24 itself.

The board 60 is electrically connected to the electrical contacts (not shown) of the battery power supply unit 24 by means of welded cables 64.

Alternatively, the electrical connection between the battery power supply unit 24 and the board 60 could take place through spring contacts.

The management circuit and the possible other circuits made on the board 60 are furthermore connected to a three-conductor cable 66 that extends from the board 60 and comes out from the container 32 through an opening 68, made for example at the lug 56 of the portion 36 thereof. A flexible sheath 70 is preferably provided at the opening 68.

During use of the electronic gearshift, the three-conductor cable 66 carries the power supply from the battery power supply unit 24 to the users, and in particular to the motor gear 22, which in the embodiment shown is housed in the support body 12. The three-conductor cable 66 also carries the power supply for recharging the battery power supply unit 24. Furthermore, the three-conductor cable 66 carries data signals that are exchanged between the smart battery formed of the battery power supply unit 24 and the management circuit thereof, and the remaining electrical/electronic components housed in the support body 12, for example information on the detected temperature or on the residual charge of the smart battery.

The three-conductor cable 66 therefore extends up to the support body 12, and is sufficiently flexible and long as to allow the short stroke of the chain guide 14 in its movement among the toothed wheels 1102.

Inside the support body 12, the three-conductor cable 66 is electrically connected, in the manner better described hereinafter, to the motor gear 22 and/or to the other users and circuits.

Furthermore, at the support body 12, the three-conductor cable 66 is electrically connected to a recharging port 72 (FIG. 5) faced at the support body 12—at an opening that is not visible—for the removable connection of the battery power supply unit 24 to the electrical mains through a cable or a recharging device (not shown) provided with a matching connector.

The recharging port 72 is preferably of the USB type.

The electric front derailleur 10 preferably comprises a recharging circuit for supplying a voltage or a current that is controlled over time—derived from the mains voltage received through the recharging port 72—to the battery of the battery power supply unit 24 during recharging from the electrical mains.

As illustrated more clearly in FIG. 5, a protective cover 74 is preferably provided to protect the recharging port 72 when the cable or recharging device is not connected thereto.

The protective cover 74 preferably has a fake connector 76 matching the recharging port 72, so as to engage stably thereonto.

Advantageously, the protective cover 74 is made of flexible material, and is provided with a holed sleeve 78 to receive a small nail 80 projecting from the support body 12.

In this way, the protective cover 74 is easily removable—and therefore replaceable—through elastic deformation of the holed sleeve 78, and can remain attached to the support body 12 also when the recharging port 72 is uncovered for use.

Figure 6:
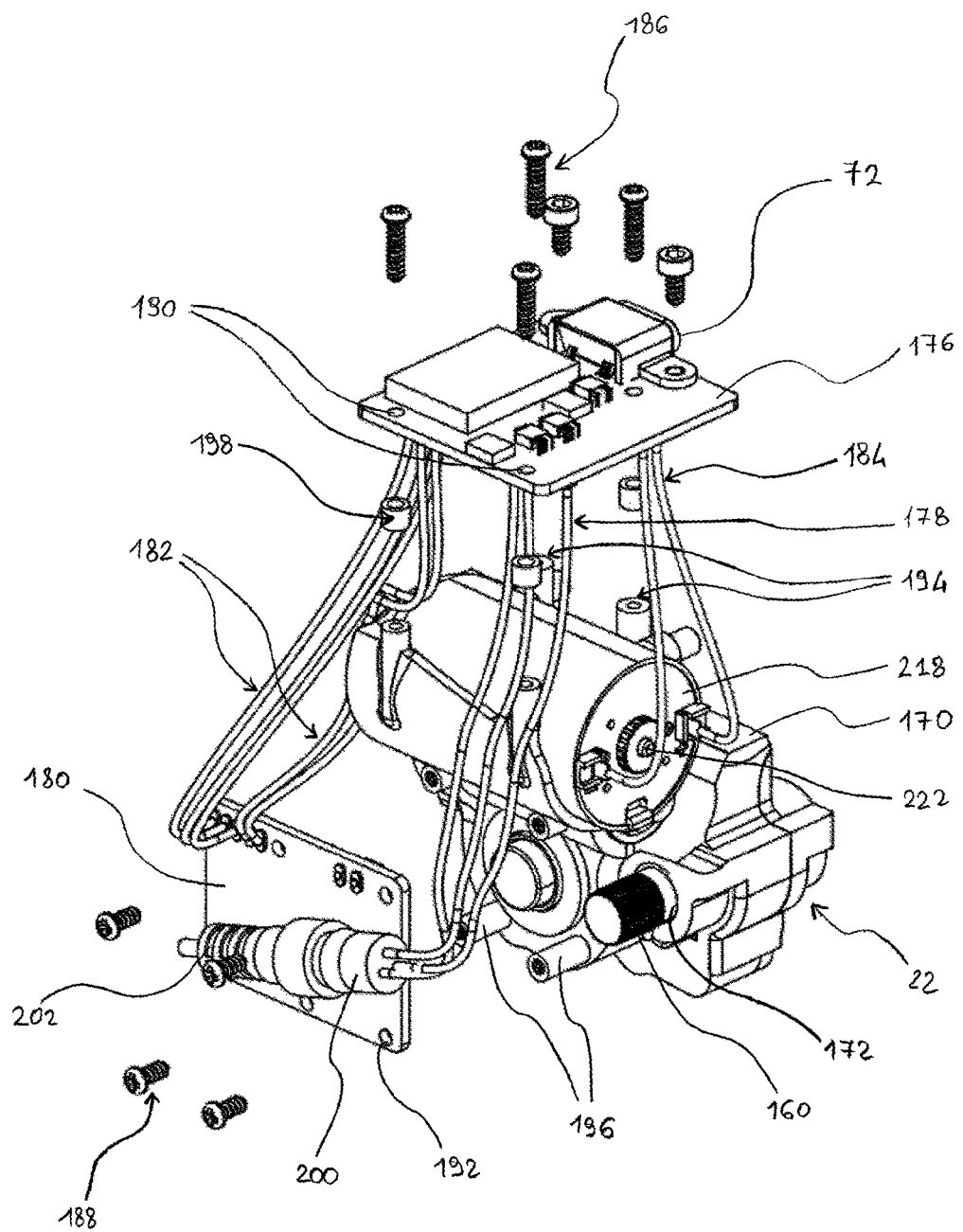
FIG. 6 is a partially exploded view of components housed within a support body of the derailleur according to the first embodiment.

Now with reference in particular to FIGS. 5 and 6, the electric front derailleur 10 of the first embodiment is described in greater detail, it being understood that such details are provided merely as a non-limiting example.

A casing of the support body 12 is made of two casing portions 82, 84 suitably constrained to each other, for example by thermowelding, ultrasound welding, sealing, gluing, etc.

The aforementioned means 13 for fixing the support body 12 to the frame of the bicycle 1100 are exemplified through a bolt formed of a screw 86 and a nut 87. The screw 86 is screwed into a hole 88 of an insert 89 that fixes to the first casing portion 82, for example through a pin 90.

The attachment to the bicycle takes place by clamping the bolt 86, 87 at a through hole of the frame of the bicycle—in particular of the seat post tube—extending along the travel direction. The support body 12 seats between the seat post tube and the rear wheel, so that the chain guide 14 is correctly in position with respect to the toothed wheels 1102.

In such a mounted configuration, the container 32 housing the battery power supply unit 24 is arranged between the chain guide 14 and the frame of the bicycle, advantageously protected, hidden, and having little aerodynamic impact.

Preferably, a contact plate 91 is also provided, arranged between the nut 87 and the first casing portion 82, which during mounting is arranged between the nut 87 and the seat post tube. The plate 91 preferably has a cylindrical face contacting the seat post tube and a partially flat face contacting the nut 87.

The linkage 16 that connects the chain guide 14 in a displaceable manner with respect to the support body 12 is formed, as stated, by an articulated parallelogram that comprises the two connecting rods 18, 20, each articulated, at opposite ends, to the support body 12 and to the chain guide 14, respectively.

More specifically, the inner connecting rod 18 is coupled with the support body 12 in a pivotal manner about a rotation axis X defined by an idle pin 92, and is coupled with the chain guide 14 in a pivotal manner about a rotation axis Y defined by a pair of coaxial idle pins 94.

The outer connecting rod 20 is coupled with the support body 12 in a pivotal manner about a rotation axis W defined in the manner better specified hereinafter, and is coupled with the chain guide 14 in a pivotal manner about a rotation axis Z defined by a pin 98.

The inner connecting rod 18 is generically horseshoe shaped, defined by a cross member 100 and by legs 102, 104.

The idle pin 92 defining the rotation axis X extends through an unthreaded hole 106 formed at the first end of the inner connecting rod 18 close to the leg 102, through an unthreaded hole 108 formed in the second casing portion 84, through an unthreaded hole 110 formed at the first end of the inner connecting rod 18 close to the leg 104, and is screwed into an internally threaded sleeve 111 formed on the insert 89. The holes 106, 110 of the inner connecting rod 18 are formed in particular in respective lugs 112 projecting from the cross member 110 on the opposite side with respect to the legs 102, 104.

The pair of idle pins 94 defining the rotation axis Y each extend through an unthreaded hole 114 formed at the second end of the inner connecting rod 18, and through an unthreaded hole 116 formed at the chain guide 14, and are axially held by a respective Seeger ring 118. The unthreaded holes 114 are formed in particular at the free end of each leg 102, 104. The unthreaded holes 116 are formed in particular on ears 120 of the inner plate 26 of the chain guide 14, more clearly visible in FIG. 4.

The outer connecting rod 20 is made in two pieces 122, 124, joined together as if they were a single piece, preferably through a pin-type coupling 126, and also is generically U-shaped.

The idle pin 98 defining the rotation axis Z extends through an unthreaded hole 128 formed at the second end of the outer connecting rod 20, with interposition of a bushing 130, and through unthreaded holes 132 formed at the chain guide 14, and is axially held by a Seeger ring 134. The unthreaded hole 128 is formed in particular through the first piece 122 only of the outer connecting rod 20.

The unthreaded holes 132 are formed in particular on ears 136, 138 of the inner plate 26 of the chain guide 14.

In greater detail and as can be seen more clearly in FIG. 4, the inner plate 26 and the outer plate 28 of the chain guide have portions 140, 142 bent towards one another and overlapped, which are joined together by a rivet 144 extending in suitable aligned holes, only one of which holes is visible and indicated with reference numeral 146; furthermore, the outer plate 28 has a second portion 148 bent towards the inner plate 26 and joined thereto through a screw 150 extending in suitable aligned holes, only one of which holes is visible and indicated with reference numeral 152.

The aforementioned ears 136, 138 extend from the bent portion 140 of the inner plate 26. Preferably, the ear 136 passes through a suitable opening 154 of the bent portion 142 of the outer plate 28, so as to contribute to fixing together the plates 26, 28 of the chain guide 14.

The inner plate 26 of the chain guide 14 preferably has one or more apertures 156 (two of which are shown as an example). Such apertures 156 allow the chain guide 14 to be made lighter, and prevent the accumulation of grease and dirt between the plates 26, 28 of the chain guide 14. Furthermore, when formed at the area where the chain guide 14 supports the container 32, they allow to facilitate the cooling of the battery power supply unit 24, and to facilitate the removal of the container 32 for any reason, by pushing it from behind with the finger.

The outer plate 28 of the chain guide 14 also preferably has one or more apertures 158 (three of which are shown as an example, visible in FIGS. 2, 5), which allow the chain guide 14 to be made lighter, and avoid the accumulation of grease and dirt.

The legs 102, 104 of the inner connecting rod 18 also preferably have apertures, one of which is visible and indicated with reference numeral 103.

Going back to FIG. 5, the rotation axis W of the outer connecting rod 20 about the support body 12 is defined by an output shaft 160 of the motor gear 22. In this way, the outer connecting rod 20 is driven in rotation by the motor gear 22, so that the articulated parallelogram linkage and the motor gear 22 embody the electromechanical actuator.

In greater detail, on the side, an end of the output shaft 160 of the motor gear 22 engages in a hole 162 formed in the portion 122 of the outer connecting rod 20; on the other side, a pin 164 extending from the portion 124 of the outer connecting rod 20 engages in a hole (not shown) formed in the other end of the output shaft 160.

This configuration of the articulated parallelogram is particularly advantageous and represents an innovative aspect per se, that may be used in any front or rear derailleur, irrespective of how the battery power supply unit 24 is supported.

Still in greater detail, the casing portions 82, 84 of the support body 12 define an inner chamber 168 and a framework 170 is housed within the inner chamber 168.

As better shown in FIG. 6, the framework 170 supports the motor gear 22 and has two holes, only one of which is visible and indicated with reference numeral 172, at the two ends of the output shaft 160 of the motor gear 22. The end of the shaft 160 projects through the hole 172, while the pin 164 of the outer connecting rod 20 penetrates in the shaft 160 through the hole that is not shown.

Advantageously, the framework 170 also supports a second printed circuit board 176. The second board 176 supports the recharging port 72 described above.

Preferably, the second board 176 also supports the recharging circuit described above.

Furthermore, advantageously the same second board 176 supports some of the electrical and electronic components described above, such as the communication circuit—advantageously wire less—with the rest of the electronic gearshift, the feedback sensor, the microcontroller, etc.

Three conductors, globally indicated with reference numeral 178, which electrically correspond to the three conductors of the three-conductor cable 66 of the battery power supply unit 24, and that therefore carry the power supply to and from the battery power supply unit 24, and the data from and to its management circuit described above, extend from the second board 176.

Advantageously, the framework 170 further supports a third printed circuit board 180. The third board 180 preferably supports the driving circuit of the motor gear 22. Alternatively or in addition, the third board 180 preferably supports one or more sensors for controlling the motor gear 22 and/or other components and circuits.

Between the second board 176 and the third board 180 five conductors extend, wholly globally indicated with reference numeral 182, which carry the power supply and the data to and from the third board 180, in particular to the driving circuit of the motor gear 22.

Two conductors, globally indicated with reference numeral 184, which carry the power supply to the motor gear 22, also extend from the second board 176.

The boards 176, 180, in the example shown, are mounted on the framework 170 respectively through screws 186, 188 extending in unthreaded holes 190, 192 of the boards 176, 180, and screwed into holed sleeves 194, 196 of the framework 170. Spacers 198 are also shown.

This arrangement of the boards 176, 180, even if merely exemplary, allows a suitable aeration, and avoids overheating of the electrical and electronic components despite them being close to the motor gear 22. Advantageously, the boards 176, 180 extend in perpendicular planes as shown.

Advantageously, the three conductors 178 that extends from the second board 176 are joined to the corresponding conductors of the three-conductor cable 66 of the battery power supply unit 24 in a removable manner.

In detail, the three conductors 178 are gathered into a removable connector 200 that removably engages with a matching removable connector 202 (FIGS. 2, 3, 5) arranged at the end of the three-conductor cable 66 of the battery power supply unit 24.

Such a pair of connectors 200, 202 allows the detachment of the battery power supply unit 24 from the support body 12, but alternatively the three conductors of cable 66 could be directly connected to the second board 176, or the conductors 178 and the three conductors of cable 66 could be irremovably connected.

Advantageously, the connector 200 is supported by the third board 180.

An opening 204 of the support body 12 allows the engagement of the connector 200 with the matching connector 202.

Advantageously, the opening 204 is formed in a sleeve 206 of the casing portion 84, so that the interface between the two connectors 200 and 202 is recessed and less exposed to atmospheric agents and to dirt. Furthermore, the sleeve 206 acts as a support for the connector 202 on the side of the chain guide 24.

A support element 208 of the connector 200 on the side of the three conductors 178 is also provided. Preferably, the support element 208 is slidably engaged on the support body 12.

According to a particularly advantageous aspect, the electric front derailleur 10 further has a slack recovery spring 210 for the components of the linkage 16.

In the embodiment shown, the spring 210 is of the torsion type, and is arranged between the support body 12 and the inner connecting rod 18, about the pin 92 defining the rotation axis X.

Through such a spring 210 it is possible to keep the chain guide 14 spaced from the chain 1101 during the rest condition of the derailleur, avoiding the dragging of the chain 1101 on the chain guide 14 and the associated friction and noise.

A first end of the spring 210 hooks to a pin 212 of the support body 12, in particular formed on the casing portion 84. A second end of the spring 210 hooks to the cross member 100 of the inner connecting rod 18, and is blocked there in a suitable groove 214 and by a small mail 216 extending along the cross member 100.

The spring 210 is mounted in a preloaded condition and imposes such a rotation onto the inner connecting rod 18 as to pull the chain guide 14 towards the support body 12.

The spring 210 therefore biases the chain guide 14 towards the frame of the bicycle 1100, differently from the prior art according to which the chain guide 14 is biased away from the frame of the bicycle 1100.

The arrangement at the rotation axis X between the inner connecting rod 18 and the support body 12 is preferred since it is the position furthest downstream in the linkage 16 that transmits the motion from the motor gear 22. However, alternatively, the spring 210 can be arranged further upstream in the linkage 16, namely between the inner connecting rod 18 and the chain guide 14, or between the outer connecting rod 20 and the chain guide 14.

Such a spring 210 represents an innovative aspect per se, that may be used in any front or rear derailleur, irrespective of how the battery power supply unit 24 is supported.

The motor gear 22 typically comprises an electric motor 218, and a gear train operatively arranged between a drive shaft 222 of the motor 218 and, the output shaft 160.

The gear train can for example comprise a plurality of toothed members, engaged in pairs and/or coaxial and co-rotating in pairs and/or a worm screw.

The speed reduction ratio between the drive shaft 22 and the output shaft 160 of the motor gear 22 is given in a per se known way by the number and type of gears used, as well as by parameters like for example the number of teeth of the toothed members of the gear train.

In the case shown, the drive shaft 222 and the output shaft 160 extend perpendicular to each other.

In the motor gear 22 there can be a position sensor, for example a magnetic position encoder.

The distribution of the electrical and electronic components housed in the support body 12 on two printed circuit boards 176, 180 is not strictly necessary: a single board or vice-versa three or more boards could be provided, the changes to the connections described above being within the capabilities of those skilled in the art in the light, of the above description.

As an alternative to what is described above, the recharging circuit could be housed in the inner chamber 54 of the container 32 housing the battery power supply unit 24.

Still as an alternative, the recharging port could also be provided facing from the container 32 housing the battery power supply unit 24.

An embodiment wherein the recharging circuit and the recharging port 72 are housed in the same container as that housing the battery power supply unit 24 is described hereinafter with reference to FIG. 12.

FIGS. 7-10 show a chain guide 300 of an electric front derailleur according to a second embodiment of the invention, which supports the battery power supply unit 24. Components that are the same as or similar to those of the first embodiment are not described in detail.

Also in this case the battery power supply unit 24 is removably supported by the chain guide 300.

In this embodiment, instead of using screwing, two holding devices 302 are used. The chain guide 300 is suitably modified with respect to that of the first embodiment, as is the container 304 housing, among other things, the battery power supply unit 24.

Also in this case, the battery power supply unit 24 is supported, by means of the container 304, in particular by the inner plate 306 of the chain guide 300.

Each holding device 302 comprises a lever 308 hinged onto the inner plate 306 of the chain guide 300. The lever 308 comprises a holding arm 310 and a driving arm 312.

The two holding devices 302 are advantageously the same, but mounted rotated by 180° with respect to one another, so as to direct the holding arms of the two holding devices 302 both towards the container 304 housing the battery power supply unit 24.

The lever 308 is elastically biased towards a condition in which the holding arm 310 rests and pushes onto the inner face of the container 304, so as to hold the container 304—and therefore the battery power supply unit 24 housed therein—in position against movement away in the direction perpendicular to the main plane of the inner plate 306, namely in the inward direction.

Figure 7:
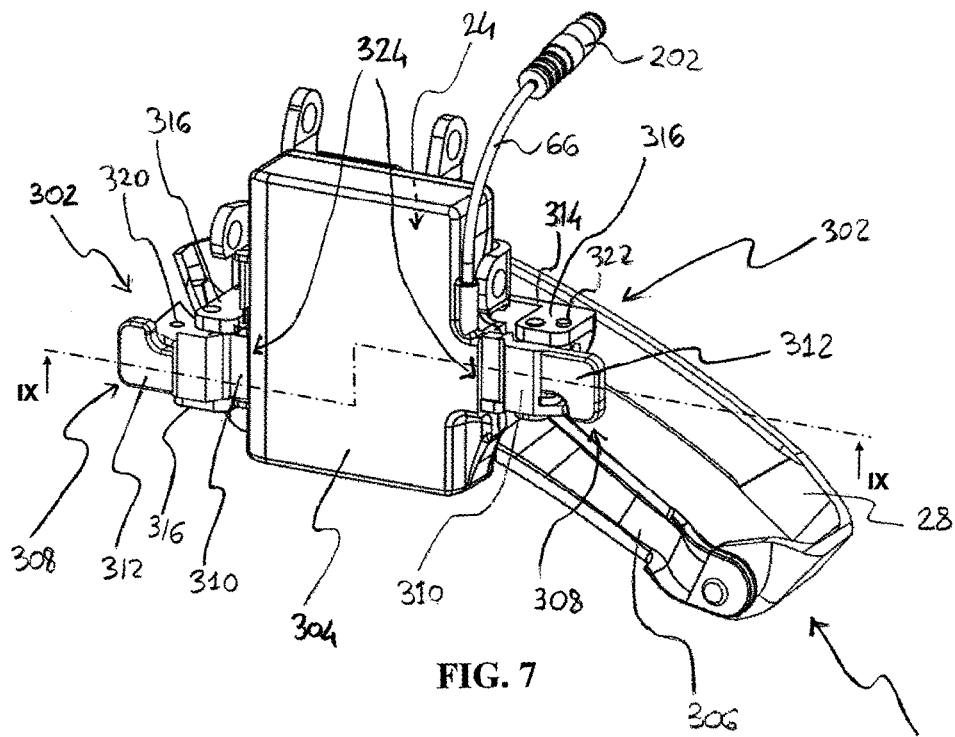
FIGS. 7 and 8 illustrate a chain guide, a container that houses, among other things, the power supply unit, and some other components of a bicycle electric front derailleur according to a second embodiment of the invention, in two distinct mutual relationships.
Figure 8:
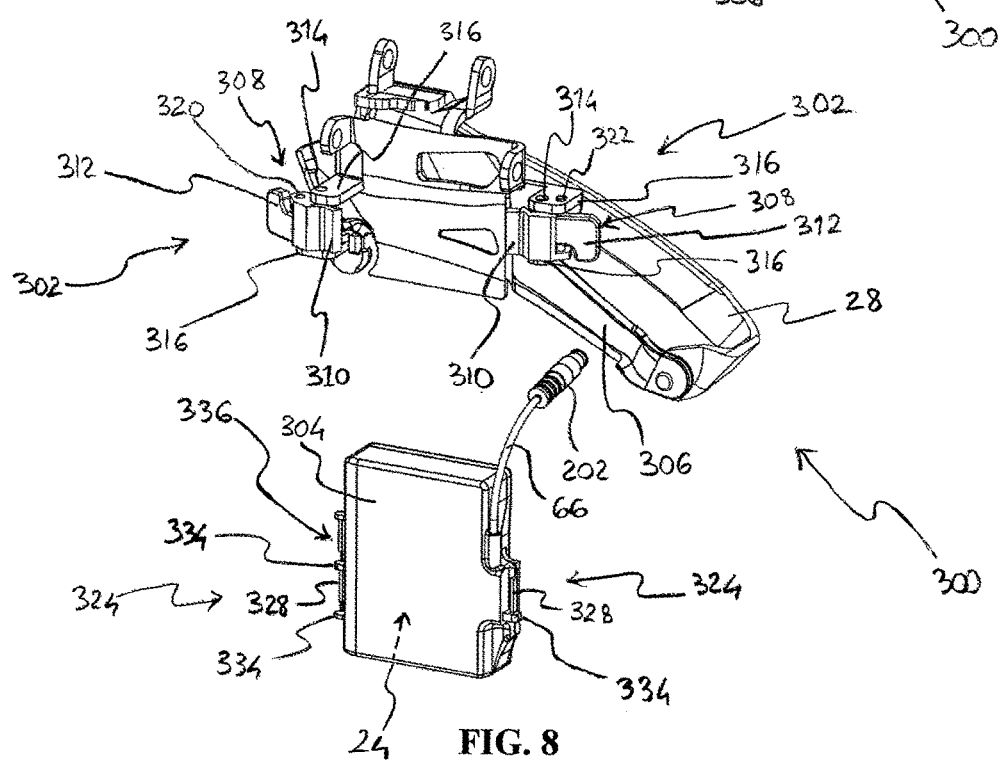
Figure 9:
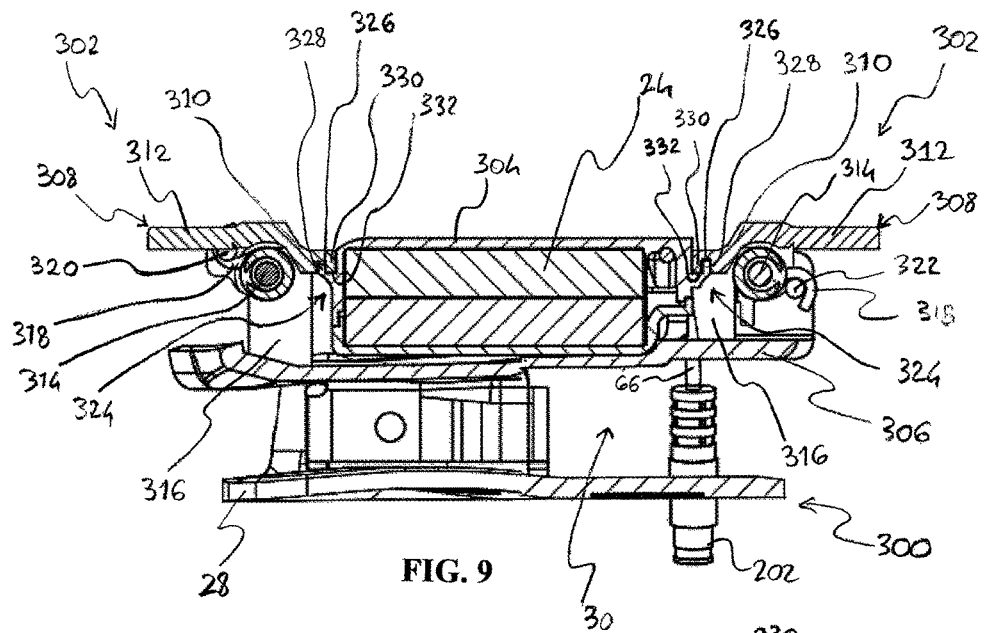
FIG. 9 illustrates a partial cross-section through the components shown in FIGS. 7 and 8, taken along line IX-IX of FIG. 7.
Figure 10:
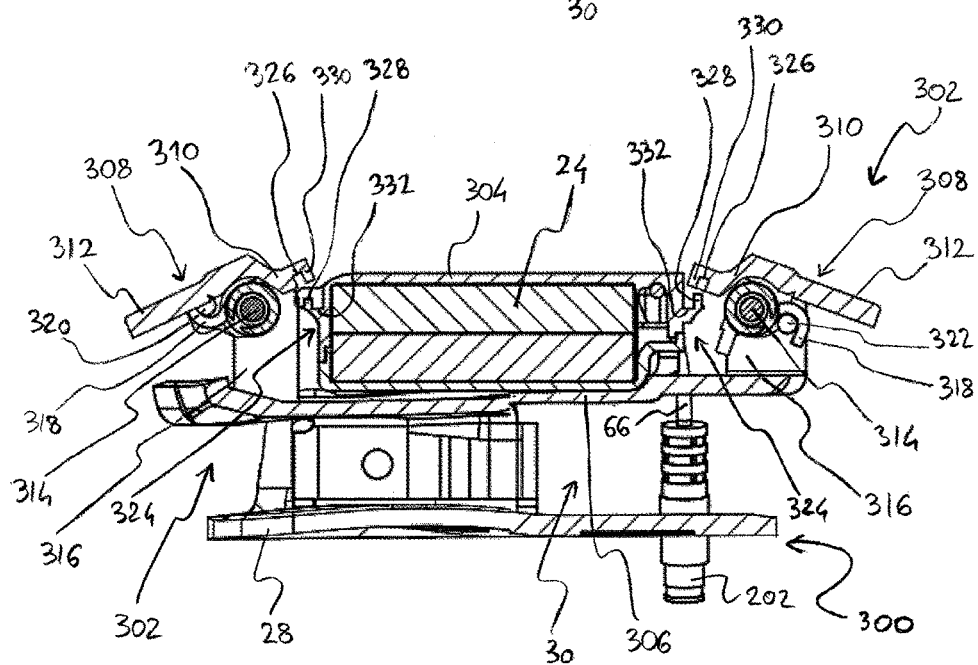
FIG. 10 illustrates a cross-section analogous to FIG. 9, in a different mutual relationship of the components.

FIGS. 7-9 show the stable state of the two holding devices 302, wherein in FIGS. 7 and 9 the container 304 housing among other things the battery power supply unit 24 is seated and held on the chain guide 300, while in FIG. 8 the container 304 is completely separate from the chain guide 300. FIG. 10 shows the unstable state of the two holding devices 302, during pressing with the fingers on the driving arms 312, with the container 304 seated on the chain guide 300 even if not held, in a release or fastening step.

In greater detail, in the exemplary embodiment shown, the lever 308 is pivoted on a pin 314 extending between and supported by a pair of ears 316 projecting from the inner plate 306 of the chain guide 300, from its inner face, namely from its face opposite the gap 30 for receiving the chain 1101.

A return spring 318 is operatively arranged between the lever 308 and the chain guide 300 to provide the aforementioned elastic bias. For example, the spring 318 is a helical torsion spring arranged around the articulation pin 314 of the lever 308. A first end of the spring 318 is hooked to a second pin 320 supported by the lever 308, and a second end of the spring 318 is hooked to a third pin 322 extending between and supported by the ears 316. The second pin 320 is only visible in the left holding device 302 in FIGS. 7-10, while the third pin 322 is only visible in the right holding device 302 in FIGS. 7-10.

Preferably, the holding arm 310 of each lever 308 is configured to look into a respective hooking seat 324 formed on the container 304, so as to hold the container 304 and therefore the battery power supply unit 24 in position against the displacement in at least one direction parallel to the main plane of the inner plate 306.

The holding arm 310 for this purpose has a groove 326 in which a rib 328 formed in the fastening seat 324 of the container engages, and a rib 330 that engages in a groove 332 formed on the hooking seat 324 of the container 304, so as to hold the container 304 and therefore the battery power supply unit 24 in position against the displacement in a first direction parallel to the main plane of the inner plate 306, namely the direction perpendicular to the direction of the grooves and ribs 326, 328, 330, 332.

Preferably, the hooking seat 324 of the container 304 has an abutment shoulder 334 at at least one end of the groove 332, so as to hold the container 304 and therefore the battery power supply unit 24 in position against the displacement in at least one direction in a second direction parallel to the main plane of the inner plate 306, perpendicular to the first direction. In the embodiment shown, the hooking seat 324 on the right of the container 304 has only one shoulder 334, while the hooking seat 324 on the left of the container 304 has two shoulders.

The container 304 also has a further hooking seat 336, which is not used in the embodiment shown, but which can be exploited for attaching another component.

The driving arm 312 of the lever 308 of each holding device 302 has a substantially planar shape, and preferably projecting laterally outside of the space delimited by the ears 316 supporting the articulation pin 314 of the lever 308.

Preferably, the driving arm 312 widens in the laterally outer region outside of the space delimited by the ears 316, in order to increase the surface to facilitate pressing with a finger.

The driving arm 312, even more preferably, has an asymmetrical shape, widening on only one side to take up a generic L-shape. The driving arms 312 thus open out one upwards (the left one in FIGS. 7-10) and the other downwards (the right one in FIGS. 7-10), with reference to the mounted condition.

The chain guide 300 otherwise corresponds to the chain guide 14 described with reference to the first embodiment, except that the holes 40 and 48 are missing, as are the screws 38 and 46.

The container 304 otherwise corresponds to the container 32 described with reference to the first embodiment, except that the lugs 52, 56, 58 are absent.

It will easily be understood that it is possible, alternatively, to make grooves and ribs in the holding arm 310 of the lever 308 and in the hooking seat 324 on the container 304 that are not rectilinear, with which to hold the battery power supply unit 24 in position against the displacement in all directions parallel to the main plane of the inner plate 306.

Alternatively or in addition to the hook like configuration of the holding arm 310 of the lever 308 of the holding devices 302, it is possible to provide, on the chain guide, a recessed seat for the container in which the battery power supply unit 24 is housed, for example by bending one or more edges of the inner plate 306 of the chain guide 300 to form a respective abutment shoulder, so as to limit at least in part the movement of the container 304 in the directions parallel to the main plane of the inner plate 306. In particular, since in an operative condition such a plane is vertical, it may be suitable to provide a shoulder along at least one section of the edge of the inner plate 306 that is lowermost in use.

Furthermore, it will be understood that the movement of the container 304 in the directions parallel to the main plane of the inner plate 306 can also be limited through a pin coupling made between the inner face of the inner plate 306 of the chain guide 300 and the face of the container 304 facing thereto in a mounted condition (the one not visible in FIGS. 7 and 8).

The number of holding devices 302 could vary, a single holding device 302 or, for example, three or four holding devices 302 being provided, arranged at the sides of the container 304. In the case of a single holding device 302, on the side opposite thereto, a holding edge will for example be made through bending of the inner plate 306 of the chain guide 300.

Figure 11:
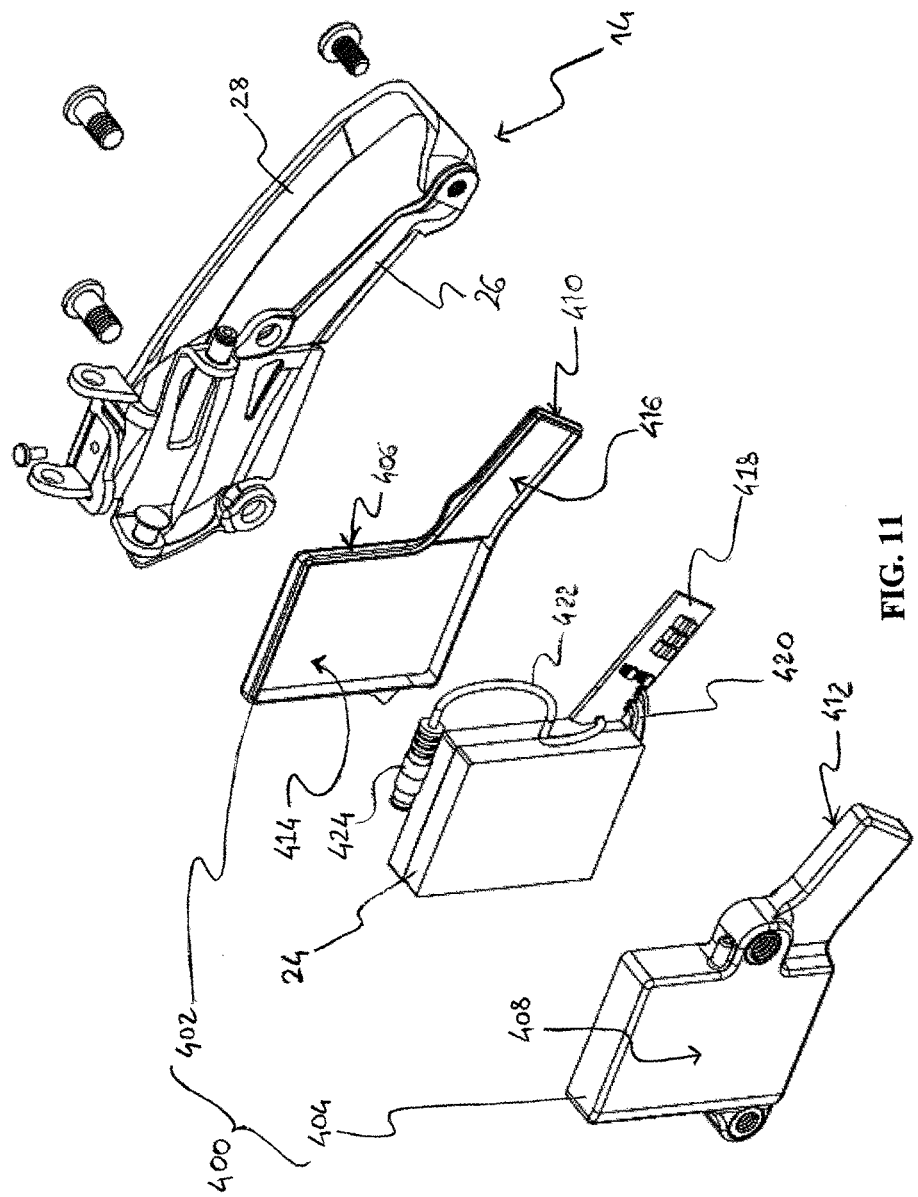
FIG. 11 is a partially exploded view illustrating a chain guide, a power supply unit, and some other components of a bicycle electric front derailleur according to a third embodiment of the invention.

FIG. 11 illustrates the chain guide of an electric front derailleur according to a third embodiment of the invention, which supports the battery power supply unit 24. Components that are the same as or similar to those of the first embodiment are not described in detail.

In this embodiment, the chain guide is unchanged and is again indicated with reference numeral 14, while the change concerns the container 400 and the components housed thereinto, including the battery power supply unit 24.

Therefore, similarly to what has been described for the first embodiment of the invention, also in this case the battery power supply unit 24 is removably supported by the chain guide 14, in particular screwed thereto.

Also in this case, the battery power supply unit 24 is supported, through the container 400, in particular by the inner plate 26 of the chain guide 14.

Each of two container portions 402, 404 has a main region, 406 and 408 respectively, and an appendage, 410 and 412 respectively. The main regions 406, 408 define a main inner chamber 414 of the container 400 adapted for housing the battery power supply unit 24.

The appendages 410, 412 advantageously define a secondary inner chamber 416, which provides an additional space for housing electronic components.

In the secondary inner chamber 416, a printed circuit board 418 is housed.

The board 418 carries the management circuit of the battery power supply unit 24, which similarly to the first embodiment is connected to the terminals of the battery power supply unit 24, to form a so-called smart battery.

The inner chambers 414, 416 communicate with each other, so as to allow the passage of the cables 420.

The management circuit made on the board 418 is connected to a three-conductor cable 422 that extends from the board 418 and comes out from the container 400 in a manner totally analogous to the first embodiment.

The three-conductor cable 422 is also preferably provided with a connector 424, corresponding to the connector 202 of the first embodiment.

Advantageously, the appendage of the container 400, formed by the appendages 410, 412 of the container portions 402, 404, extends obliquely from the main region of the container 400, formed by the main regions 406, 408 of the container portions 402, 404, so as to extend along the inner plate 26 of the chain guide 14. With such an arrangement, the appendage of the container 400 is hidden from view and protected from collisions by the chain guide 14 besides, as well as having the least possible aerodynamic impact.

The board 418 can furthermore carry the recharging circuit of the battery power supply unit 24, which in this case will be absent from the board 176 housed in the support body 12, the changes to the electrical connections being manifest to those skilled in the art in the light of the present description.

It should be understood that the configuration of the container 400 with the appendage defining the secondary inner chamber 416 of the third embodiment can also be used in the case of a container supported by one or more holding devices 302 as described above with reference to the chain guide 300 of the second embodiment, the changes to be made to the container 400 being manifest to those skilled in the art in the light of the present description.

Figure 12:
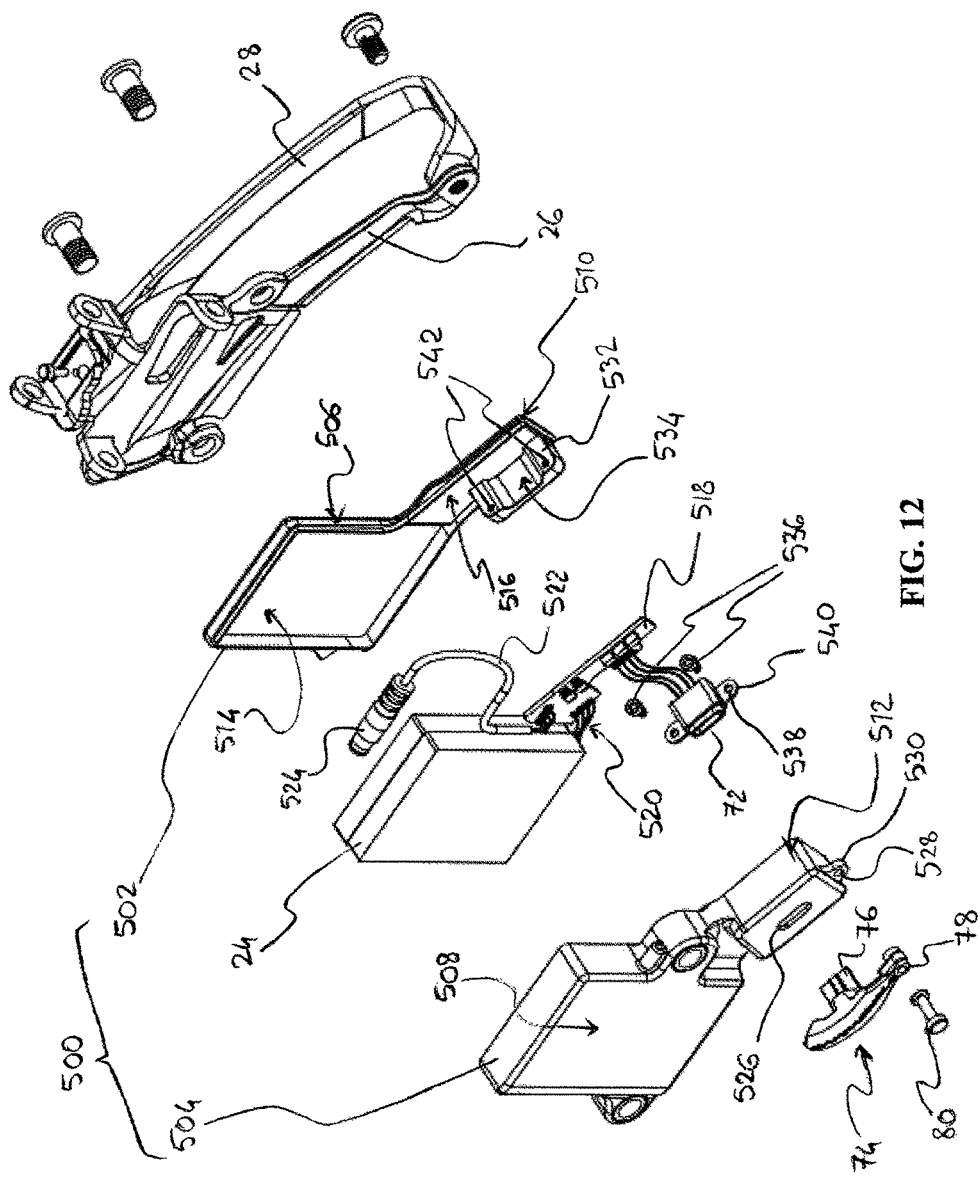
FIG. 12 is a partially exploded view illustrating a chain guide, a power supply unit, and some other components of a bicycle electric front derailleur according to a fourth embodiment of the invention.

FIG. 12 illustrates the chain guide of an electric front derailleur according to a fourth embodiment of the invention, which supports the battery power supply unit 24. Components that are the same as or similar to those of the first or of the third embodiment are not described in detail.

Also in this embodiment, the chain guide is unchanged and is again indicated with reference numeral 14, while the change concerns the container 500 and the components housed thereinto, including the battery power supply unit 24.

Therefore, similarly to what was described for the first and, the third embodiment of the invention, also in this case the battery power supply unit 24 is removably supported by the chain guide 14, in particular screwed thereto.

Also in this case, the battery power supply unit 24 is supported, through the container 500, in particular by the inner plate 26 of the chain guide 14.

Also in this embodiment, like in the third embodiment described above, each of two container portions 502, 504 has a main region, 506 and 508 respectively, and an appendage, 510 and 512 respectively. The main regions 506, 508 define a main inner chamber 514 of the container 500, adapted for housing the battery power supply unit 24. The appendages 510, 512 define a secondary inner chamber 516.

In the secondary inner chamber 516, a printed circuit board 518 is housed.

Advantageously, the appendage of the container 500, formed by the appendages 510, 512 of the container portions 502, 504, extends obliquely from the main region of the container 500 formed by the main regions 506, 508 of the container portions 502, 504, so as to extend along the inner plate 26 of the chain guide 14, with the advantages outlined above.

The board 518 carries the management circuit of the battery power supply unit 24, which similarly to the first embodiment is connected through cables 520 to the terminals of the battery power supply unit 24, to form a so-called smart battery.

The inner chambers 514, 516 communicate with each other, so as to allow the passage of the cables 520.

In this case, the board 518 also carries the recharging circuit of the battery power supply unit 24, as well as the recharging port 72, which in this case will be absent from the board 176 housed in the support body 12—the changes to the electrical connections being manifest to those skilled in the art in the light of the present description.

The management circuit made on the board 518 is connected to a three-conductor cable 522 that extends from the board 518 and comes out from the container 500 in a manner totally analogous to the first embodiment.

The three-conductor cable 522 is also preferably provided with a connector 524, corresponding to the connector 202 of the first embodiment.

The management circuit made on the board 518 is also suitably connected to the recharging circuit made on the same board 518.

During use of the electronic gearshift, the three-conductor cable 522 also in this case carries the power supply from the battery power supply unit 24 to the users, and in particular to the motor gear 22, housed in the support body 12, as well as data signals that are exchanged between the smart battery and the remaining electrical/electronic components housed in the support body 12, for example information on the detected temperature or on the residual charge.

The three-conductor cable 522 does not, on the other hand, carry the power supply for recharging the battery power supply unit 24.

In greater detail, the recharging port 72 is fixed to the appendage 510 of the first container portion 502, and the appendage 512 of the second container portion 504 has an opening 526 for accessing the recharging port 72.

Advantageously, also in this case a removable cover 74 of the recharging port 72 is provided, totally analogous to that of the first embodiment. The small nail 80 of the cover 74 is fixed in a hole 528 formed for example in a flange 530 of the appendage 512 of the second container portion 504.

Preferably, the appendage 510 of the first container portion 502 carries a support element 532 for the recharging port 72, upright in the secondary inner chamber 516.

The support element 532 has a seat 534 recessed within a side wall thereof, having a shape compatible with that of the recharging port 72. The recharging port 72, positioned in the seat 534, is fixed to the support element 532, for example screwed by means of screws 536 inserted in unthreaded holes 538, formed on flanges 540 of the recharging port 72, and screwed into threaded holes 542 formed on the support element 532.

It is also possible to avoid the support element 532 and fix the recharging port 72 directly on the board 518, by providing the opening 526 for accessing the recharging port 72 on a side face of the appendage 512 of the second container portion 504.

It should be understood that the configuration of the container 500, with the appendage defining the secondary inner chamber 516 and housing the recharging port 72, of the fourth embodiment can also be used in the case of a container supported by one or more holding devices 302 as described above with reference to the chain guide 300 of the second embodiment, the changes to be made to the container 500 being manifest to those skilled in the art in the light of the present description.

It is also manifest that the recharging port could also be provided in the case of a container without appendages, like for example the container 32, 304 of the first or of the second embodiment, provided that the respective inner chamber 54 is sufficiently large.

Figure 13:
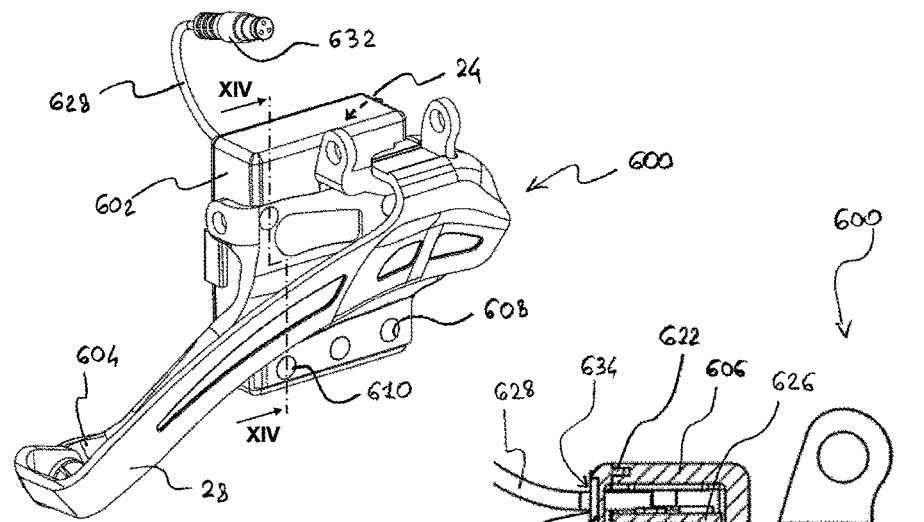
Figure 14:
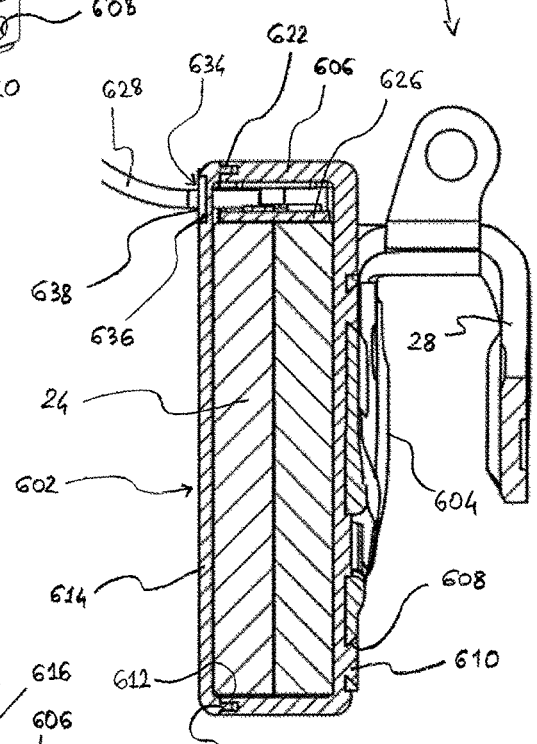
Figure 15:
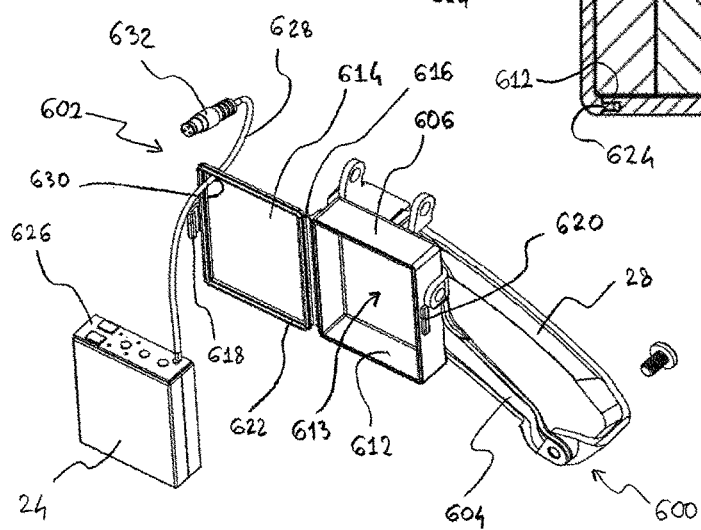

FIGS. 13-15 illustrate the chain guide 600 of an electric front derailleur according to a fifth embodiment of the invention, which supports the battery power supply unit 24. Components that are the same or similar to those of the first or third embodiment are not described in detail.

Also in this case, the battery power supply unit 24 is supported, through a container 602, in particular by the inner plate 604 of the chain guide 600.

In this embodiment, the change concerns both the chain guide 600 and the container 602 housing, among other things, the battery power supply unit 24.

In this case, the container 602 is substantially irremovably supported by the chain guide 600.

In particular, in the embodiment shown, the container 602 comprises a portion 606 for housing the battery power supply unit 24 that is made in a single piece with the chain guide 600.

Even more specifically, making the housing portion 606 of the container 602 and the chain guide 600 in a single piece takes place through co-molding.

For this purpose, the inner plate 604 of the chain guide 600 comprises holes 608 that make an undercut with respect to the inner face of the inner plate 604 itself, as can be seen in the cross-section view of FIG. 14. The material of the container 602, during molding, fills such holes 608 and, thanks to the undercut, forms an enlarged head 610 that holds the container 602 on the chain guide 600.

The housing portion 606 has an opening 612, through which it is possible to insert and remove the battery power supply unit 24.

In the embodiment shown, the opening 612 is made on the inner face of the housing portion 606 of the container 602.

In the case shown, a door 614 is provided for closing the opening 612.

The door 614 is co-molded with the housing portion 606 of the container 602, and thus is co-molded with the chain guide 600.

In particular, in the embodiment shown, the door 614 is hinged to the housing portion 606 through a thin, and therefore flexible, strip of material 616.

The door 614 and the housing portion 606 are respectively provided with a hook 6318 and with a lug 620 for hooking the hook 618 to keep the door 614 in closed condition.

The door 614 preferably comprises a collar 622 that seats into a groove 624 of the housing portion 606 of the container 602.

A gasket could be housed in the groove 624 to improve the tightness of the container 602.

In addition to the battery power supply unit 24, a printed circuit board 626 is housed in the housing portion 606.

The board 626 carries the management circuit of the battery power supply unit 24, which similarly to the first embodiment is connected to the terminals of the battery power supply unit 24 to form a smart battery.

The management circuit carried by the board 626 is suitably connected to a three-conductor cable 628 that extends from the board 626.

The three-conductor cable 628 comes out from the container 602 through an opening 630.

The opening 630 is preferably sized for the passage of a removable connector 632, analogous to the removable connector 202 of the first embodiment.

The opening 630 is preferably recessed within a seat 634, which houses an annular cover 636, the inner hole 638 of which is sized in accordance with the three-conductor cable 628.

The board 626 can furthermore carry the recharging circuit of the battery power supply unit 24, as discussed with reference to the previous embodiments.

The door 614 could, as an alternative to making it through co-molding and to its hooked closure, be differently fixed to the housing portion 606, for example welded or glued, or it could be removably constrained to the housing portion 606, for example through screwing.

Alternatively or in addition, the opening 612 and the related door 614 could be made on another face of the container 602, for example on the bottom face of the housing portion 606 of the container 602, which is opposite the (upper) face of the container 602 that faces towards the support body 12.

It should also be understood that the container 602 could be configured with an appendage defining a secondary inner chamber in an analogous manner to the third or fourth embodiment, with all of the variants and generalizations indicated for such embodiments.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

It should be understood that, in all of the embodiments of the electric front derailleur according to the invention, the configuration of the support body 12, of the linkage 16 and of the motor gear 22 can be substantially different from what has been described above merely as a non-limiting example.

For example, it should be expressly mentioned that, as an alternative to the articulated parallelogram, the linkage 16 can for example comprise a rack system or a worm screw system.

In all of the embodiments of the electric front derailleur, the motor gear 22 can be replaced by the electric motor 218 only.

It is not necessary for the motor gear 22 to be coupled with and to directly drive the outer connecting rod 20 of the articulated parallelogram linkage 16. It could be coupled with the inner connecting rod 18. Alternatively, the motor gear 22 could be arranged along the diagonal of the articulated parallelogram. Still as an alternative, a different linkage could be used, coupled in a suitable manner with the motor gear 22, or furthermore a different electromechanical actuator could be used, for example comprising one or more linear motors directly coupled with the chain guide without any interposed linkage.

The shape of the support body 12 and the connection means 13 to the frame of the bicycle 1100 can be substantially different from what is illustrated and described.

The shape of the inner and outer plates of the chain guide, in particular in terms of their interaction with the chain 1101 and with the linkage 16, can also be remarkably different from what is illustrated and described.

Furthermore, although in the various embodiments shown and described, the battery power supply unit 24 is always supported by the inner plate of the chain guide, it could be supported by the outer plate of the chain guide.

As an alternative to the removable connectors, between the battery power supply unit and the motor gear and/or the electronics powered thereby, a fixed electrical connection can be provided, or a sliding contact can be provided.

It is also worthwhile emphasizing that the battery power supply unit 24 could be provided only for supplying power to the electronics, the electric motor 218 of the motor gear 22, on the other hand, being powered by another battery power supply unit, for example shared with the rear derailleur.

What is claimed is:

1. An electric front derailleur of a bicycle, comprising a support body that is configured to be attached to a frame of the bicycle, a chain guide connected to the support body through a linkage, an electric motor that drives the linkage to displace the chain guide among toothed wheels of a motion transmission system, and a battery power supply unit, wherein the battery power supply unit is supported by the chain guide.

2. The derailleur according to claim 1, wherein the battery power supply unit is provided for supplying power to the electric motor and/or to at least one electrical/electronic component of the derailleur.

3. The derailleur according to claim 1, wherein the battery power supply unit is housed within a container.

4. The derailleur according to claim 3, wherein the container housing the battery power supply unit is removably supported by the chain guide.

5. The derailleur according to claim 3, wherein the container comprises a portion for housing the battery power supply unit that is fixedly supported by the chain guide.

6. The derailleur according to claim 5, wherein the housing portion of the container is made in one piece with the chain guide.

7. The derailleur according to claim 5, wherein an opening of the housing portion of the container is made on an inner face of the housing portion of the container.

8. The derailleur according to claim 1, wherein the chain guide comprises an inner plate and an outer plate, and the battery power supply unit is supported by the inner plate.

9. The derailleur according to claim 1, further comprising a management circuit of the battery power supply unit.

10. The derailleur according to claim 1, further comprising a recharging circuit for providing a recharge voltage and/or current of an intensity controlled over time to the battery power supply unit.

11. The derailleur according to claim 2, wherein the motor and/or at least part of electrical/electronic components powered by the battery power supply unit are fixedly supported on the support body.

12. The derailleur according to claim 11, wherein a flexible cable connects a container housing the battery power supply unit and the support body.

13. The derailleur according to claim 1, wherein a recharging port is provided for removable connection of the battery power supply unit to electrical mains through a cable or a recharging device provided with a matching connector.

14. The derailleur according to claim 13, wherein the recharging port is fixedly supported on the support body, or is supported by the chain guide.

15. The derailleur according to claim 13, further comprising a cover for protecting the recharging port when the cable or recharging device is not present.

16. The derailleur according to claim 6, wherein the housing portion of the container is co-molded with the chain guide.

17. The derailleur according to claim 9, wherein the management circuit is housed within the same container as the battery power supply unit.

18. The derailleur according to claim 10, wherein the recharging circuit is supported by the support body.

19. The derailleur according to claim 10, wherein the recharging circuit is supported by the chain guide.

\* \* \* \* \*